May 25, 1965
H. L. MATTHEWS
3,185,322
POWERED TAILGATE LIFT
Filed Aug. 8, 1962
2 Sheets-Sheet 1
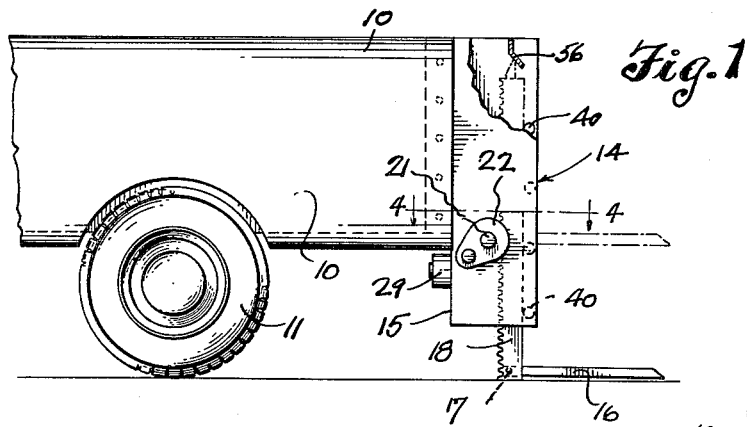
Fig. 1
Fig. 4
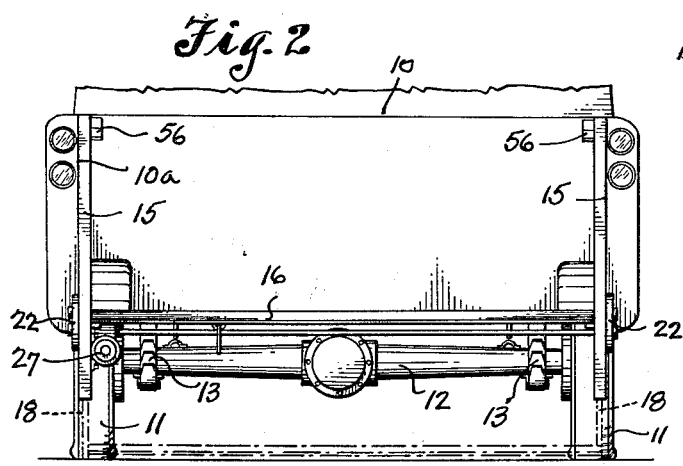
Fig. 2
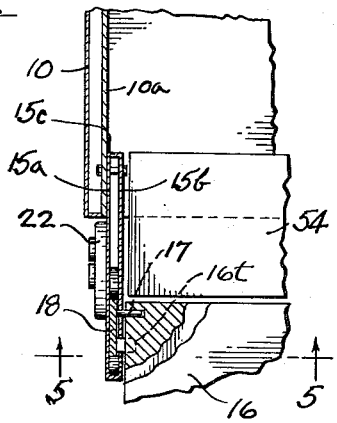
Fig. 3
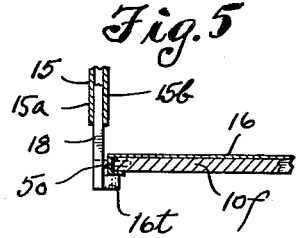
Fig. 5
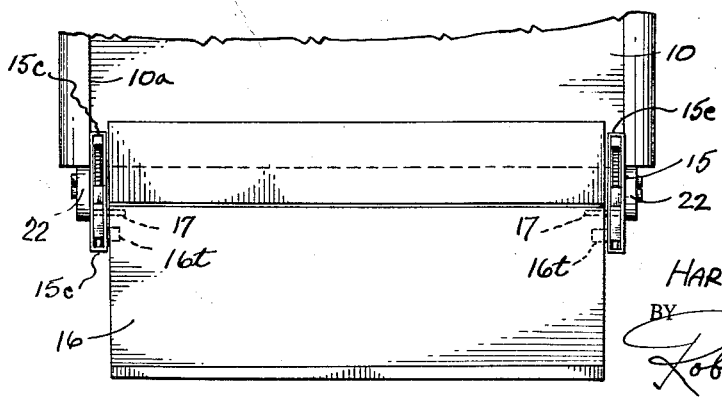
INVENTOR.
HARRY L. MATTHEWS
BY
Robinson & Berry
ATTORNEYS

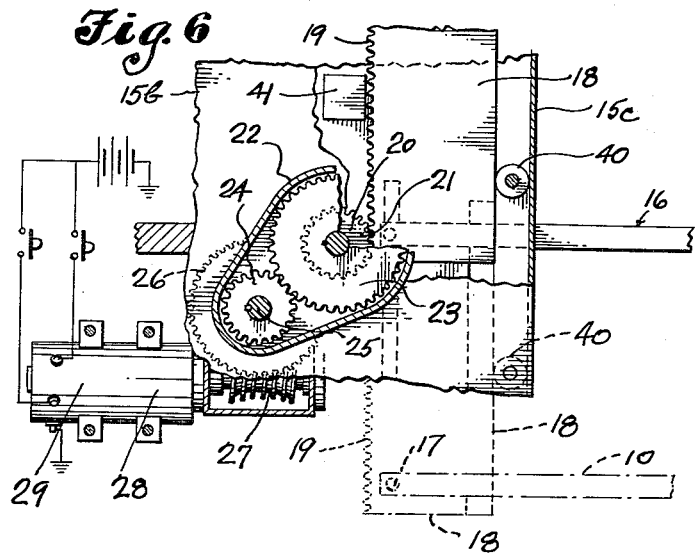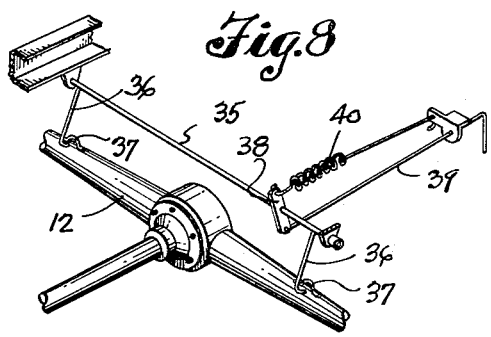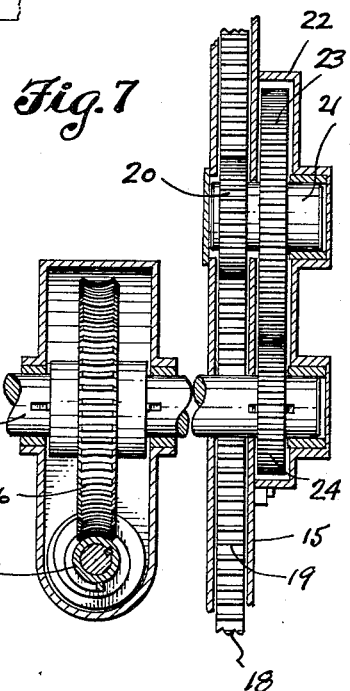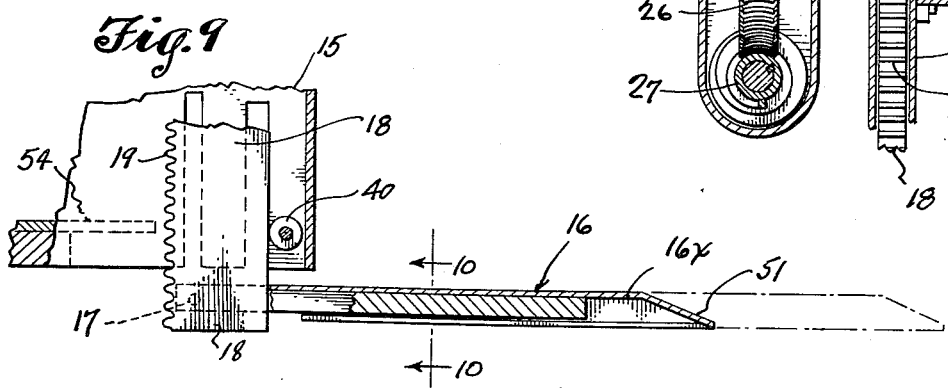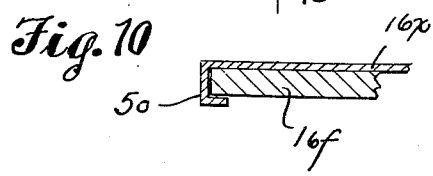

United States Patent Office 3,185,322
Patented May 25, 1965

3,185,322
POWERED TAILGATE LIFT
Harry L. Matthews, 6403 Flemming St., Everett, Wash.
Filed Aug. 8, 1962, Ser. No. 215,690
3 Claims. (Cl. 214—75)

This invention relates to improvements in powered tailgate lifts as designed for use on automobile trucks and the like. More particularly it relates to the provision of a tail gate and its lift mechanism designed as a unitary construction that may be readily attached to the usual pick up truck body without requiring any rebuilding or material alteration of the body structure as it already exists.

It is the principal object of this invention to provide a tailgate that is designed for load lifting thereon and is equipped with lift mechanism that is powered by a reversible battery driven electric motor, operating through conventional reduction gearing for the lifting or lowering of loads placed on the gate and which automatically retains the gate at any load lifting position to which it may be adjusted, when the motor is at rest.

It is also an object of the present invention to provide a powered tail gate lift attachment wherein the tail gate is extendable and retractable within predetermined limits to best suit its requirements at any particular time and which gate may be engaged against retaining stops when swung to a closed position and extended to its limit of upward travel.

Another object of the present invention resides in the provision of a tail gate lift mechanism that may be employed for jacking up the rear end of the truck body as for lifting the truck wheels above ground for tire changing.

Further objects and advantages of the invention reside in the details of construction of the various parts employed in the unitary lift structure and in their combination and mode of use, as will hereinafter be described.

In accomplishing the above mentioned and other objects of the invention, I have provided the improved details of construction, the preferred forms of which are illustrated in the accompanying drawings, wherein:

FIG. 1 is a side view of the rear end portion of a pick up truck body equipped with a unitary tailgate and powered lift gearing, embodied by the present invention.

FIG. 2 is a rear end elevation of the truck as equipped with the present tailgate and lift mechanism.

FIG. 3 is a horizontal showing of the lift mechanism as applied to opposite sides of the truck body.

FIG. 4 is a view of one of the opposite side frames or housings for the gate lifting rack bars, taken on line 4—4 in FIG. 1.

FIG. 5 is a sectional view taken on line 5—5 in FIG. 4.

FIG. 6 is an enlargement of rack bar adjusting gears at one side of the truck body and the gear driving motor.

FIG. 7 is an enlargement of the driving gearing as applied to the rack bar housing at one side of the truck body, and as used in connection with powering motor.

FIG. 8 is a perspective view showing the means for locking the spring mounted body to the differential axle preparatory to a wheel lifting operation by means of the gate lifting devices.

FIG. 9 is a sectional detail of the tail gate structure and adjacent parts.

FIG. 10 is a vertical section on line 10—10 in FIG. 9.

Referring more in detail to the drawings:

10 designates the rear end poriton of a typical pickup truck body as supported by the usual ground wheels 11—11 which are here shown to be mounted at opposite ends of a differential axle housing 12 through the mediacy of the usual pair of leaf springs 13—13 as seen in FIG. 2.

The present unitary tailgate structure, designated in its entirety in FIG. 1 by reference number 14, comprises opposite side plate-like housings 15—15 that are disposed vertically and in laterally spaced parallel relationship as required for the bolting or otherwise securing of their rear vertical edge portions flatly against the inside surfaces 10a and 10b of the rear end portions of the opposite sidewalls of the truck body 10 as shown in FIGS. 1 and 3.

It is noted in FIGS. 3 and 4 that each of the housings 15 is formed by spaced, opposite side plates 15a–15b, joined in spaced relation along their front and rear vertical edges by connecting wall portions 15c. Each housing provides a space therein for the vertical guidance and adjustment of a rack bar, presently to be described, for mounting the tail gate.

The tail gate, herein designated in its entirety by numeral 16, extends substantially to the full width of the truck body between the lower ends of the housings 15—15 and is pivotally mounted at its opposite ends, and adjacent its inner edge, as at 17 in FIG. 1, on the lower ends of a pair of vertical rack bars 18—18 that are mounted for endwise up and down sliding adjustment in the guideways provided therefor in the rear edge portions of the opposite side housings 15—15. The length of these rack bars is such that they project from the top and bottom edges of the housings and their endwise adjustment is of such extent that the gate may be lifted thereby from a position disposed flatly against a floor or road surface, as seen in FIG. 1, to any elevated position up to the level of the floor 10f of the truck body. When the tail gate 16 is in a horizontal lifted position, as in dash lines in FIG. 1, it may then be manually swung upwardly on its pivot mountings 17 from the horizontal position of FIG. 1 to a vertical, closing position and there secured, as presently will be described. When in any horizontal load supporting position, the gate will be held secure against downward swinging movement below a horizontal level by its engaging against supporting lugs 16t welded to the inside surface at the lower ends of the opposite rack bars. These lugs 16t are set rearwardly of the pivots 17 and do not interfere with any upwardly hinging movements of the gate to vertical position.

The two rack bars 18—18 are formed to their full lengths on their forward vertical edges with gear teeth 19. Operatively meshed with the teeth of the rack bars as mounted at opposite sides of the body are relatively small gear pinions 20—20 of like size. These are keyed on short stub shafts 21 that extend through the opposite side plates of housings 15—15 and into housings 22 fixed to their outside walls, as best shown in FIG. 6. Each stub shaft 21 is rotatably mounted and has a relatively large gear 23 keyed thereto in the corresponding housing 22 and these gears 23 are, in turn, operatively meshed with pinion gears 24—24 of lesser diameter that are keyed on opposite ends of a cross-shaft 25 that extends between and through the opposite side housings 15—15 at floor level as in FIG. 2. Between its ends, and at a point that is relatively close to the left hand housing 15 in FIG. 2, the cross-shaft 25 has a relatively large worm gear 26 keyed thereon, as in FIG. 6, which is operatively meshed with the thread of a worm shaft 27 extending rearwardly from a reduction gear mechanism 28 that is combined with a reversible electric motor 29, and this motor and gear unit is rigidly mounted on the lower end portion of the adjacent housing 15 as seen in FIG. 2.

The power for lifting or lowering the tail gate is transmitted from the electric motor 29 through the gear reduction mechanism 28 to the worm shaft 27, to worm gear 26, thus to drive the cross-shaft 25 and the pinion gears 24—24 keyed thereon. These latter gears together with the gears 23 and 20 as keyed on the stub shafts 21, at opposite sides of the body provide the gear trains that shift the rack bars 18—18 upwardly or downwardly in unison, to lift or lower the tail gate 16 accordingly. Corresponding gears of the gear trains at opposite sides are equal in size. The reversible electric motor 29 is under conventional switch control in a circuit connected with the car battery and is operable to control lifting or lowering operations. Any up or down adjustment of the tail gate may be made by proper switch setting from the driver's position.

If a further downward adjustment of the rack bars 18—18 is made after the gate has been brought in ground engaging position, as in FIG. 1, the rear end of the truck body will be lifted accordingly through the mediacy of the housings 15—15. If it is desired to lift the wheels 11 from the ground, it is advisable that the leaf springs 13—13 be held against downward deflection; this being accomplished by a latch mechanism such as that shown in FIG. 8 wherein a rock shaft 35 is mounted transversely by and in the rear end of the truck frame above axle housing 12. This rock shaft 35 is equipped near its opposite ends with a pair of downwardly extending latch hooks 36—36 adapted to be holdingly engaged with lifting loops 37—37 fixed to outer end portion of the axle housing 12.

The rock shaft 35 is equipped with a rocker arm 38 to which a pull rod 39 is attached and a coil spring 40 is attached under tension to this rocker arm and to the vehicle frame to normally hold the latch hooks 36 disengaged from the lift loops 37—37. If it is desired to lift the vehicle wheels 11—11 from the ground, the tail gate 16 is first lowered to ground engaging position, as in FIG. 1, then the cross-shaft 35 is rotated by pull on rod 39, to engage the hooks 36—36 with the lifting loops 37—37 and the lifting power applied by motor 26 for the farther downward extending of the rack bars, thus to effect the desired body and wheel lifting.

It will be understood by reference to FIGS. 1 and 4 that each of the opposite housings 15—15 provides a vertical guideway in its rear edge portion for the rack bars. Between the side plates at the rear edge of each housing, a plurality of vertically aligned bar guiding rollers 40 are mounted against which the untoothed longitudinal edge of the rack bar is engaged for its adjustment. Forwardly spaced from the aligned rollers are rack bar guiding blocks as shown in 41. The trains of gears that are associated with the rack bars at opposite sides of the body are identical and therefore the travel of rack bars is equal and in unison. All gears are suitably housed for protection and safety in use of the device.

A feature of construction of the tail gate is shown in FIG. 9 wherein it is observed that the gate 16 comprises a rectangular core portion 16f of full size that is pivoted at its ends on the rack bars 18—18 for swinging from horizontal to vertical position. Fitted over this core portion 16f is a telescopically extendable and retractable plate section 16x. This has opposite end flanges 50 bent down and beneath the side edges of the section 16f and has a downwardly sloped rear end edge 51.

The space between the rear end edge of the truck floor and adjacent edge of the tail gate is spanned by a flat plate 54 fixed to the truck floor as shown in FIG. 3.

One of the features of this unitary construction resides in the fact that it is light in weight, easily and readily applied to all present day types of pick up trucks and serves adequately for the lifting of loads for movement into or for lowering loads from the truck. Also, it serves as an auxiliary jack.

When it is desired to secure the tail gate in body closing position, it is swung to its vertical position but not to its upper limit, then it is lifted farther as required to cause its beveled outer edge to engage beneath holding lugs 56—56 formed on and projecting from the inside surfaces of the sidewalls of the housings 15—15. To release the gate for downward swinging, it is only necessary to lower it slightly to disengage its lip from the lugs 56.

For removal of the unitary structure from the truck body, it is only required that the securing bolts applied through the forward edges of the housing 15—15 be withdrawn. This permits the gates and its adjusting means to be removed as a unit.

What I claim as new is:

1. In combination, a truck having a cross-axle with ground wheels with a spring mounted body fixed thereon; a powered tail gate and lift mechanism comprising paired housings fixed to the rear end portions of opposite side walls of the body and extended rearwardly therefrom and formed with vertical guideways therethrough, paired rack bars movable endwise in said guideways, and extended downwardly from the housings, a tail gate mounted by and extended between the lower ends of the rack bars, for downward adjustment by said powered means to engage the lower ends of said rack bars and gate against the ground surface for lifting the truck body, and latch hook means attached to said body directly above said cross axle for adjustment into holding connection with said axle for lifting the axle and its mounting wheels from the supporting surface by the extension of the rack bars to the rear cross axle thus to effect lifting of the wheels from the surface with the lifting of the body by the rack bar.

2. The combination recited in claim 1 wherein the last mentioned means comprises transverse a cross-shaft mounted in the body frame, latch hooks extending downwardly therefrom, hook receiving loops on the cross axle, and manual means for rotatably adjusting the transverse cross shaft to engage the latch hooks with said loops to provide the axle and wheel lifting connection.

3. A unitary tail gate and power lift attachment in combination with a truck body having opposite side walls and a horizontal bottom mounted on a supporting cross-axle equipped at its ends with ground wheels and having a detachable axle lifting connection means with the truck body said power lift attachment comprising paired, vertical housings attached to the rear end vertical edges of said side walls to extend rearwardly therefrom beyond the end edge of the truck bottom; each of said housings having a vertical guideway therein, paired rack bars contained for vertical movement in said guideways, a tail gate extended between the lower end portions of said rack bars and pivoted at its lower corners thereto for swinging rearwardly between a horizontal load lifting and body end closing position, a cross-shaft extended between and rotatably mounted at its ends by said housing, gear pinions mounted on said cross-shaft for actuating said rack bars and gate downwardly against the truck supporting surface for truck body and cross-axle lifting when said truck body and cross-axle are attached by the connection means or for moving it upwardly for load lifting and a power unit supported by said housings below truck floor level for powering said cross-shaft.

References Cited by the Examiner

UNITED STATES PATENTS

| 874,525 | 12/07 | McGranor et al. |
|---|---|---|
| 1,628,880 | 5/27 | Heise. |
| 2,110,239 | 3/38 | Richter. |
| 2,405,054 | 7/46 | Pringle. |
| 2,523,962 | 9/50 | Mahaffey et al. _____ 214—516 X |
| 2,850,186 | 9/58 | Zwight. |
| 3,024,926 | 3/62 | Nolden. |
| 3,035,720 | 5/62 | Selzer. |

FOREIGN PATENTS 760,808   11/56   Great Britain.

HUGO O. SCHULZ, *Primary Examiner.*

GERALD M. FORLENZA, *Examiner.*